Dec. 17, 1935.  E. H. SMYTHE  2,024,608
SOUND AND PICTURE SYSTEM
Filed Nov. 14, 1933  4 Sheets-Sheet 1

INVENTOR
E. H. SMYTHE
BY
*J. H. Heydt*
ATTORNEY

Dec. 17, 1935.  E. H. SMYTHE  2,024,608

SOUND AND PICTURE SYSTEM

Filed Nov. 14, 1933    4 Sheets-Sheet 2

INVENTOR
E. H. SMYTHE
BY
G. H. Heydt
ATTORNEY

Dec. 17, 1935.     E. H. SMYTHE     2,024,608
SOUND AND PICTURE SYSTEM
Filed Nov. 14, 1933     4 Sheets-Sheet 3

INVENTOR
E. H. SMYTHE
BY
G. H. Heydt
ATTORNEY

Dec. 17, 1935.     E. H. SMYTHE     2,024,608

SOUND AND PICTURE SYSTEM

Filed Nov. 14, 1933     4 Sheets-Sheet 4

INVENTOR
E.H. SMYTHE
BY
ATTORNEY

Patented Dec. 17, 1935

2,024,608

UNITED STATES PATENT OFFICE 2,024,608

SOUND AND PICTURE SYSTEM

Edwin H. Smythe, Evanston, Ill., assignor to Bell Telephone Laboratories, Incorporated, New York, N. Y., a corporation of New York Application November 14, 1933, Serial No. 697,901

27 Claims. (Cl. 179—100.3)

This invention relates to sound picture systems, and more particularly to a method and apparatus for maintaining a constant and uniform velocity of movement of the linear sound record relative to the translating point.

In order that sound may be faithfully recorded upon and reproduced from a linear record carrier, such as a photographic film, it is necessary that the carrier have a uniform velocity of motion past the translating point where the sound is recorded on or reproduced from the film or carrier. It has been customary heretofore to attempt to secure this uniformity of motion at the translating point by providing means for suppressing irregularities of motion of the film itself, such departures from uniformity of film velocity ordinarily resulting from motional irregularities arising in the mechanical transmission system which drives the film and from variations in the frictional load imposed in moving the film past the translating point. These expedients for keeping the movement of the film steady and uniform as it passes the translating point ordinarily involve the interposition of a damped flexible connection and a fly-wheel in the mechanical transmission system, which elements tend to a greater or less degree to absorb the disturbing frequencies that otherwise would be transmitted to the sprocket or drum which moves the film. Stored energy in the fly-wheel also tends to insure uniform movement of the film, despite variations in the load constituted by the frictional variations of the film at the translating point.

But it has been found difficult in practice to obtain complete uniformity of film movement by means of these ordinary expedients in the presence of the various drive side and load side disturbances that are produced in the operation of the system. The underlying idea in the present invention is to effect a solution of the problem by operating upon the translating point rather than upon the film itself. In accordance with this invention, no particular attempt is made to suppress the disturbing frequencies which are superposed upon the uniform motion of the film; but instead to convert such irregularities of motion of the film at the translating point into forces that are caused to operate upon the translating point and to continuously shift its position with reference to the film in accordance with the instantaneous velocity variations of the film, so that, although the film is moving irregularly, its relative movement with respect to the translating point is uniform. The point of sound translation may be considered as a point or line in space through which the film travels at the moment when sound is translated.

The method which I prefer to employ in accomplishing this result is to convert the irregularities or departures from uniformity of motion of the film into corresponding electric currents and to utilize these electric currents to effect movements of the translating point corresponding in phase and amplitude with the velocity variations that are superposed upon the uniform motion of the film. The continuous shifting of the translating point in substantially exact correspondence with the superposed irregularities of film movement therefore compensates for these irregularities and produces a relatively uniform movement as between the film and the translating point.

There are many ways in which the above mentioned principle may be applied in effecting a more perfect operation of sound recording and reproducing apparatus. Certain of the preferred applications will be described in detail hereinafter. Inasmuch as the best known and most commonly used method for translating sound to and from linear sound record carriers is the photographic method in which a narrow line of light acts upon a photographic film, I shall in this application describe the method of utilizing the invention with this type of sound translating devices.

Ordinarily the position at which the line of recording or reproducing light impinges upon the photographic film is fixed and immovable. In accordance with the present invention this line of recording or reproducing light may be so controlled as to be capable of movement longitudinally of the film to the degree necessary for compensation by means of a tilting mirror from which the light that produces the line is reflected onto the film, or by means of a light valve through the aperture of which the light passes to the film, the mirror or light valve being controlled to shift the position of the line of light along the film by means of the electrical currents produced by the irregularity components in the film motion.

In accordance with the present embodiment of the invention the electric currents for producing the compensating movement of the translating line of light with respect to the sound track on the film may be produced by the alternating current components set up by the film velocity variations in the rotor of a homopolar generator fixed to the shaft of the film moving drum or sprocket; or by the alternating current components induced in a pick-up coil by the eddy currents flowing in an eddy-current disc fixed to the shaft of the film moving drum or sprocket. In these embodiments of the invention the electrical compensating currents or voltages are produced by variations in the absolute velocity of rotation of the film sprocket member, or the relative rate of rotation of the member with respect to a stationary reference system.

In order that the translating point may be shifted in accordance with the instantaneous velocity variations in the movement of the film or the member which drives the film, the reflecting mirror galvanometer or the light valve may be connected with the electric current generator associated with the film moving drum or sprocket by means of an electric circuit preferably including an amplifier, and so designed that the velocity output represented by the movement of the translating line of light shall, within the required frequency range of compensation, exactly correspond in phase and amplitude with the velocity input of film movement represented by the voltages produced by the film sprocket generator. This is accomplished by the proper design of the electrical connecting link between generator and light valve or galvanometer with respect to the electrical and mechanical constants.

Referring to the accompanying drawing.

The invention will first be described by reference to the diagrams which show schematically the relationship between the various elements that cooperate to secure compensation for velocity variation.

Figure 1:
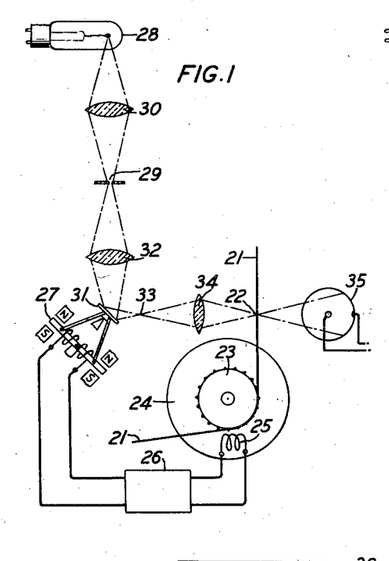
Fig. 1 is a schematic representation of a photographic sound reproducing system in which the compensating shift of the line of light at the translating point is effected by a tilting mirror electromagnetically controlled in accordance with the velocity variations of the film moving drum or sprocket.

Referring to Fig. 1, the photographic film 21 bearing the sound record is moved past the translating point 22 by means of a sound sprocket 23. The sound sprocket 23 is driven at an approximately uniform velocity by any suitable driving mechanism such as is customarily employed in talking motion picture systems. But the usual elaborate precautions employed to prevent any slight departure from absolutely uniform motion are in this case unnecessary.

On the same shaft with the sound sprocket 23 is a member 24, shown diagrammatically as a disc, which serves to generate electromotive forces that instantaneously vary in exact accordance with the instantaneous variation of velocity of the disc 24. This electric generator may be any one of a variety of forms, such as the rotor cylinder of a homopolar generator. But in the present instance it is assumed that the disc 24 is a metallic disc so placed that in its rotation it cuts a strong transverse magnetic field, and that the coil 25 is so located as to have electromotive forces generated in it corresponding with the eddy currents set up in the rotating disc by the magnetic field. These electromotive forces are applied to the input of a device 26 which acts to amplify the electromotive forces, and to deliver the corresponding currents in proper phase and amplitude to the energizing coil of a balanced armature type of oscillograph 27. This oscillograph may be generally of the type which is illustrated and described in the paper by Dimmick, published in Vol. XV, No. 4, October 1930, of the Journal of the Society of Motion Picture Engineers.

The light for translating the photographic sound record carried on film 21 into corresponding electric current variations is produced in the filament of the exciting lamp 28. The light from the filament of lamp 28 is focussed upon the slit 29 by the condensing lens 30; and the light that passes through the brightly illuminated slit, after passing through the lens 32 and being reflected from the mirror 31 of the oscillograph 27, produces an image of the light slit at point 33. This image, in the form of a brightly defined narrow line of light, is brought to a focus upon the sound track of the film at the translating point 22 by means of the objective lens 34. Any tilting of the mirror 31 shifts the position of the image at 33 and correspondingly moves, in the opposite direction, the position of the line of light along the sound track at the translating point 22.

As long as the sound sprocket 23 maintains a perfectly uniform velocity of rotation, there is no variation in the eddy-current flow in the disc 24 (assuming the proper electrical conductance uniformity in the disc), and no electromotive force is generated in the induction or pick-up coil 25. But any increase or decrease in the velocity of rotation of the sound sprocket 23 and associated eddy-current disc 24 changes the magnitude of the eddy currents, and sets up in the pick-up coil 25 a corresponding electromotive force in one direction or the other, depending upon the magnitude of the velocity variation. This electromotive force is translated into a corresponding movement of the oscillograph mirror 31, the electrical and mechanical constants of the connecting link between the eddy-current disc and the mirror being so chosen as to prevent phase shift or amplitude distortion as between the velocity variation of the eddy-current disc 24 and the movement of the line of light at the translating point 22.

The elements are so related that any momentary increase of film velocity at the translating point 22 as a result of the superposition of a disturbing frequency on the film drive or load, causes a corresponding and exactly equal forward shift of the translating line of light at the point 22 in the direction of the film movement; and the following slight decrease of film velocity resulting from the other half of the disturbing frequency cycle causes an exactly corresponding shift of the line of light at the translating point 22 in the reverse direction. As a result, although the absolute velocity of film movement may vary in consequence of superimposed disturbing frequencies, the relative film velocity with respect to the automatically shifting translating point remains perfectly steady and uniform. The light modulated in accordance with the sound recorded upon the sound track, falls upon the photoelectric cell 35 and produces corresponding modulations of the electric current flow in the associated sound reproducing circuit.

Figure 2:
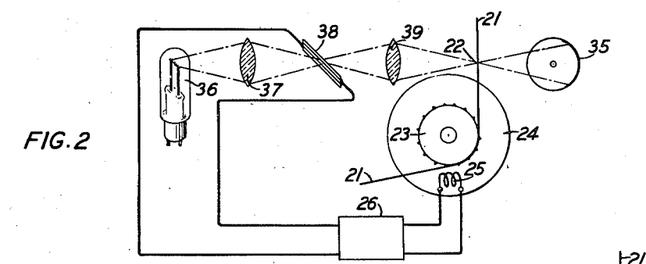
Fig. 2 is a schematic representation of a reproducing system in which the compensating shift of the translating point is effected by a light valve of the diamagnetic wire or ribbon type under the control of the velocity variations of the film moving sprocket.

In the reproducing system schematically illustrated in Fig. 2, light from the lamp 36 is concentrated by the condensing lens 37 upon the compensating light valve slit 38. The image of the brightly illuminated slit 38 is focussed upon the sound track of the film 21 at the translating point 22 by the objective lens 39. The film is moved at an approximately uniform velocity by means of the sound sprocket 23, with which there is associated an electromotive force generator diagrammatically illustrated as an eddy-current disc 24 and pick-up coil 25. The electromotive forces set up in the pick-up coil 25 by any departures from uniform rotational velocity in the sound sprocket 23 and eddy-current disc 24 are communicated to the device 26 and produce currents of proper phase and amplitude for the movement of the ribbons which define the light valve slit 38. The general construction and operation of the light valve will be more particularly described hereinafter. For the present, it is sufficient to say that the circuit is so connected with the slotted ribbon or the ribbons of the light valve that the slit is caused to move up or down (as shown in Fig. 2) in accordance with the variations in amplitude and direction of the currents communicated to it. The elements are so related that the movement of the light valve slit causes a shift in position of the line of light at the translating point 22 corresponding in amplitude and phase with the variations from uniformity of movement of the film, and therefore such as to compensate for any departure from uniformity of motion and cause a constant velocity of movement of the film with respect to the translating point.

Figure 3:
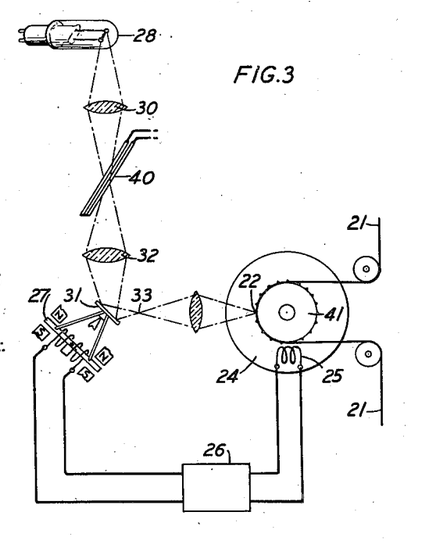
Fig. 3 is a schematic representation of a recording system in which the compensating movement of the recording line of light at the film is effected by an electromagnetically controlled tilting mirror.

The recording system illustrated in Fig. 3 corresponds generally to the reproducing system of Fig. 1, excepting that the stationary slit 29 of the Fig. 1 system is replaced by the slit 40 formed between the two ribbons of a light valve; and that, in the Fig. 3 arrangement the translating point 22 is so arranged as to coincide with a portion of the periphery of the sound sprocket or drum that moves the film bearing the sound record. The ribbons of the light valve 40 vary the slit opening between them in accordance with the variations of the electrical currents representing the sound to be recorded, and cause a corresponding variation in the height of the line of light that constitutes the image of the slit 40 at the translating point 22. In the same manner as has already been described in connection with the systems of Figs. 1 and 2, the position of the line of light at the translating point 22 is caused to shift up and down through the agency of the eddy-current disc 24, pick-up coil 25, amplifying and compensating device 26, and mirror 31 of oscillograph 27 in accordance with any variation from uniform velocity of the film driving sprocket or drum 41, the relationship of the elements being such that any variation of film movement from uniform velocity is exactly compensated by a corresponding shift of the line of light at the translating point.

Figure 4:
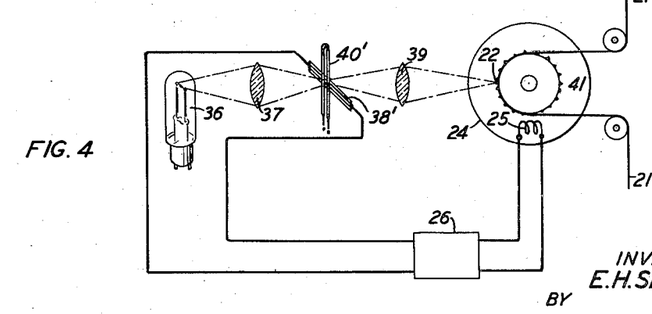
Fig. 4 represents schematically a recording system in which the compensating action is effected through the medium of a light valve.

In the recording system illustrated in Fig. 4, there are two pairs of ribbons 38' and 40'. The pair 38' effects the compensating shift of the line of light along the film, and the pair 40' controls the length of the line of light at the sound track of the film in accordance with the sound controlled currents to produce a variable area record on the sound track. These sets of ribbons extend at right angles to each other, and both may lie in and be intersected by the magnetic flux field of the magnet of the light valve. The light from the filament of exciting lamp 36 is concentrated upon the slit or opening defined by the edges of the two sets of light valve ribbons by means of condensing lens 37, the image of the filament of the exciting lamp 36 being of sufficient area to comprehend the maximum amplitude of movement of the light valve ribbons. The ribbons 40' are connected in the usual way as a loop in the circuit carrying the sound controlled currents, and the ribbons 38' are connected in parallel in the circuit in which the electric currents corresponding to the velocity variations of eddy-current disc 24 are produced, the connection being through the medium of pick-up coil 25 and amplifying and compensating device 26. Therefore, the image of the light valve slit projected by the objective lens or optical system 39 at the translating point 22 is varied in length in accordance with the sound controlled current, and is varied in position with respect to the linear movement of the film by the current corresponding with the velocity changes in the rotational movement of the sound sprocket 41 and associated eddy-current disc 24.

Figure 5:
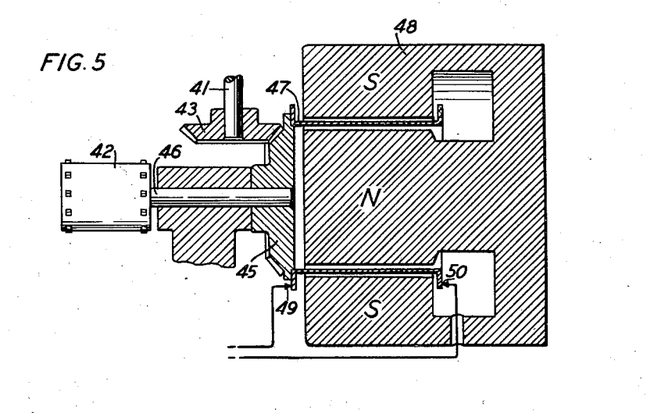
Fig. 5 shows one form of structure for converting sound sprocket velocity variations into corresponding electromotive forces for effecting the compensating shift of the line of light.

In Fig. 5 is shown a structure for converting the velocity variations imparted to the sound sprocket into electric current variations for correspondingly shifting the position of the recording or reproducing line of light on the sound track. The sound sprocket 42 is rotated to move the film through the medium of the beveled gear 43 fastened to the drive shaft 44 and the beveled gear 45 fixed upon the counter-shaft 46 carrying the sound sprocket. A metallic cylinder 47 carried upon the beveled gear 45 serves as the armature or rotor of a homopolar generator, the strong annular magnetic field in which the cylinder 47 rotates being produced by the permanent magnet 48. The potential differences set up at the ends of the cylindrical armature of the homopolar generator are communicated by means of the brushes 49 and 50 to the compensating light valve or oscillograph by way of the circuit including amplifying devices and phase shift and amplitude correcting devices such as described in connection with Figs. 1, 2, 3 and 4. Any change in the uniform velocity of the rotating system causes a corresponding change in the electromotive force between the brushes 49 and 50. This alternating current component acts through the amplifying and compensating circuit to cause a corresponding shift in the position of the line of recording or reproducing light at the sound track.

Figure 6:
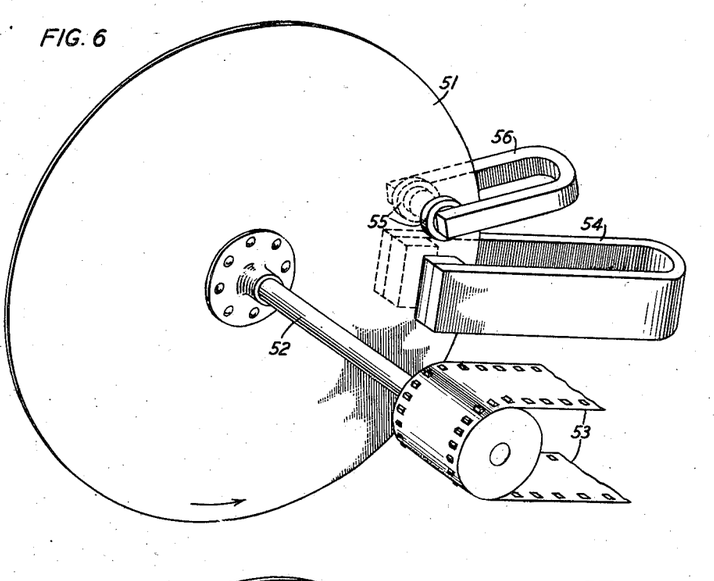
Fig. 6 is a perspective illustration of a different form of device for accomplishing this object without the use of slip rings or movable contacts.

A structure by means of which the alternating current components corresponding with velocity variations in the rotation of the sound sprocket may be picked up and made available for shifting the position of the line of recording or reproducing light without the use of brushes, is shown in perspective in Fig. 6. A light rigid disc 51 of electrical conducting material having a uniform conductivity is fixed upon the shaft 52 of the sound sprocket 53. A region in the neighborhood of the periphery of the disc cuts the lines of force of a strong flux field produced by the magnet 54, thus producing electromotive forces that set up eddy currents in the material of the disc in proximity to the portion which is cutting the magnetic field. Any variation in the velocity of rotation of the disc correspondingly varies these electromotive forces and the currents which they produce; and by placing a stationary coil or coils in close association with the disc at the point where the eddy currents are circulating, any change in the magnitude of these currents as a result of velocity variation of the disc induces corresponding variations of electromotive force at the terminals of the coil. In Fig. 6 two coils 55 are shown opposite each other on opposite sides of the disc, and the magnetic circuit for these coils is provided by the U-shaped piece of soft iron 56. The arrangement in effect constitutes a transformer, the primary winding consisting of the electric circuit within the material of the disc in which the eddy currents are flowing and the secondary winding consisting of the stationary coils 55. The two coils 55 may be included additively in a high impedance circuit, such as the input circuit of an amplifier that furnishes the compensating current for the operation of the light valve, so that the coils are used merely as voltage generators and do not produce a field having any substantial reactive effect upon the magnetic field of the permanent magnet 54. The coils 55 deliver to the input of the amplifier voltages corresponding merely to the alternating current components of the velocity variation of the disc, the direct current components being dissipated in the resistance of the disc. The disc 51 is constructed so as to have uniform resistance in the peripheral portions which cut the magnetic field of the permanent magnet and within which the eddy currents flow. The coils 55 are preferably located as close as possible to the poles of the magnet 54 and the region in the disc 51 in which the eddy currents are circulating.

Figure 7:
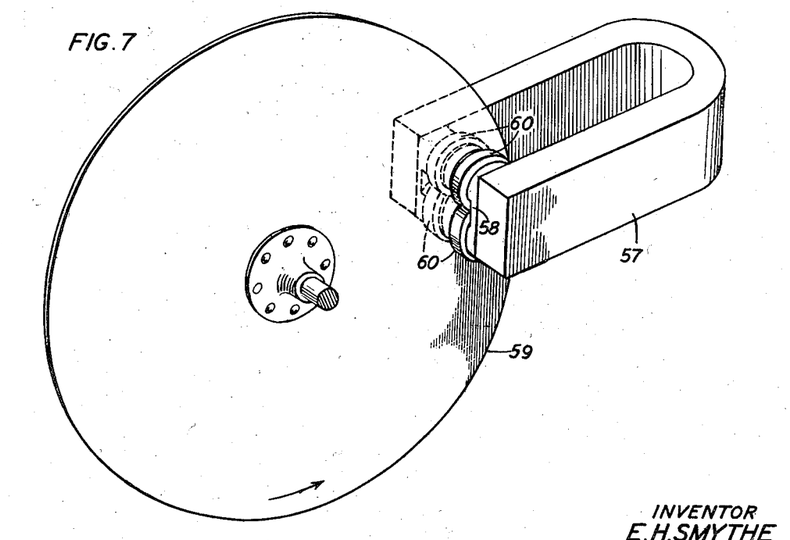
Fig. 7 shows in perspective another modification of the form represented in Fig. 6.

In the modified form illustrated in Fig. 7, the permanent magnet 57 is provided with bifurcated pole-pieces 58, one on each side of the rotating disc 59 carried on the sound sprocket shaft. Surrounding each arm of each of the pole-pieces 58 is a coil 60, and these coils are connected with the input of the light valve controlling circuit in such a way that their effects are additive. The coils 60 constitute the secondary windings of a transformer the primary of which is represented by the eddy currents flowing in the material of the disc 59 as a result of its rotation. Any variation from uniform velocity in the rotation of the disc produces corresponding changes in the magnitude of the eddy currents, and these changes of magnitude in turn produce corresponding changes in the voltages at the terminals of the secondary windings 60. The action may also be viewed as being due to a change in the distribution of the magnetic lines of force between the two branches of the magnetic circuit carried by the two sets of poles of the bifurcated pole-pieces 58. As long as the rotation of the disc 59 is uniform the flux field divides in certain proportions between the two branches, as determined by the reactive effect of the eddy currents flowing in the disc. Any change in velocity of rotation of the disc changes the reactive magnetic field and brings about a shift in the distribution of the magnetic lines of force as between the two branches, thus creating voltage changes in the windings 60. The coils are so connected that their effects upon the external circuit are additive.

The rotating member fixed to the sound sprocket shaft 52 is shown as a disc; but it will be understood that for the sake of rigidity it may be in the form of an open-ended cylinder, the axially extending shell rim of which cuts the flux field of the permanent magnet. Excepting for such changes as may be made necessary by the different direction of curvature of the rotating element, the association of the magnets and pick-up coils with such a rotating cylinder eddy-current induction generator is the same as the association of the coil with the disc form illustrated in Fig. 6 and Fig. 7.

The extent of linear displacement of the film at the translating point due to the superposed velocity variations ordinarily does not exceed a very small fraction of an inch, even for the lowest periodicity disturbances; and for disturbances of higher periodicity the displacement is very much less. Therefore, such displacements may be compensated for by a movement of the recording or reproducing line of light along the sound track that need not exceed, say, 15 or 20 mils. Inasmuch as the frequency of the velocity variations in the film that are to be compensated for is ordinarily not in excess of between 100 and 200 cycles per second, the ribbons of the compensating light valve may be relatively long and tuned to a relatively low resonant frequency, thus producing a greater range of movement of the slit or opening with the expenditure of less electrical energy.

Figure 8:
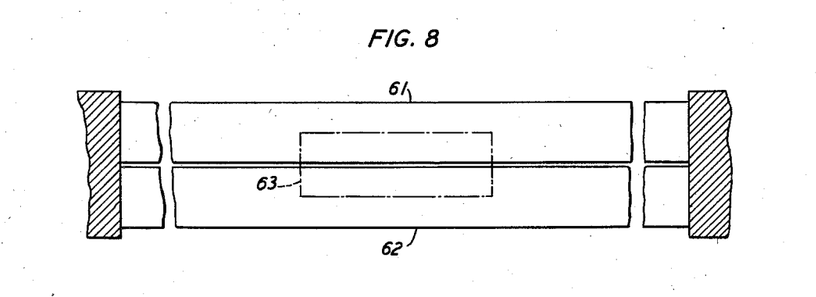
Figs. 8 and 9 illustrate portions of the ribbons of a form of light valve which may be used for effecting the compensating shift of the line of light, Fig. 8 representing a form in which the ribbons themselves serve as a shield for obscuring all parts of the light opening excepting that which registers with the slit between the ribbons, and Fig. 9 representing a form in which an obscuring shield is carried upon narrower ribbons.
Figure 9:
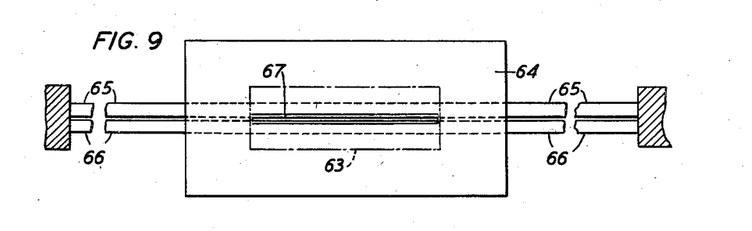

The light valve which effects the compensating movement of the line of light may be generally of the type disclosed in the article by Perreault, at page 412 of the August, 1932 issue of Bell Telephone Laboratories Record, Vol. X, No. 12. Figs. 8 and 9 illustrate portions of the ribbons of such a valve modified to adapt them for controlling the compensating shift of the recording or reproducing line of light. In the form illustrated in Fig. 8, although other dimensions than those given are suitable, it may be assumed that ribbons 61 and 62 are two inches long, 42 mils wide and ½ mil thick, and that there is a one-mil separation between their proximate edges. The aperture 63 for the passage of light between the exciting lamp and the sound track, may be assumed to be 120 mils long and 40 mils wide, so that the slit defined by the light valve ribbons is permitted an extreme amplitude of movement of approximately 40 mils before being obscured by the upper and lower edges of the aperture 63. With an optical leverage of 1:1 as between the slit and the film, this permits a corresponding extreme amplitude of compensating movement of the line of light on the film of approximately 40 mils. Each of the ribbons 61 and 62 is slightly more than 40 mils wide, so that even in the extreme amplitude of movement of the ribbons, the aperture is completely closed for the passage of any light excepting that which passes through the slit. A fixed separation between the ribbons may be ensured, if desired, by cementing or otherwise securing light transverse strips across the ribbons just beyond the edges of the aperture 63.

Inasmuch as the relatively great breadth of the ribbons of the Fig. 8 modification is necessary only to perform the function of obscuring the aperture 63 during extreme amplitudes of movement of the ribbons, it is possible, as shown in Fig. 9, to use narrower, and therefore less rigid, ribbons and to perform the aperture obscuring function by an extremely thin and light shield 64 fastened to and moving with the ribbons. In this modification the ribbons 65 and 66 may, for example, have the breadth and thickness dimensions of 6½ mils and ½ mil, respectively, of the ordinary light valve, and a length of 2 inches. The opaque shield 64 may be cemented or otherwise rigidly secured to the ribbons 65 and 66 midway of their length; and along its center the shield may be provided with a slit 67 enough larger than the slit between the proximate edges of the ribbons 65 and 66 so that the light slit is defined by the edges of the ribbons and not by the edges of the slit in the shield. As the energizing current traverses the ribbons of the compensating light valve in parallel the shield 64 may be in metallic conducting contact with the faces of the ribbons, as by being sweated thereto, without affecting the response of the device to the actuating currents that flow through it. The reduction of the stiffness factor permitted by this construction enables the valve to be tuned to a lowered resonance frequency (but one that lies safely above the highest disturbing frequency that needs to be compensated for), and to be actuated by a relatively small amount of electrical energy.

Figure 10:
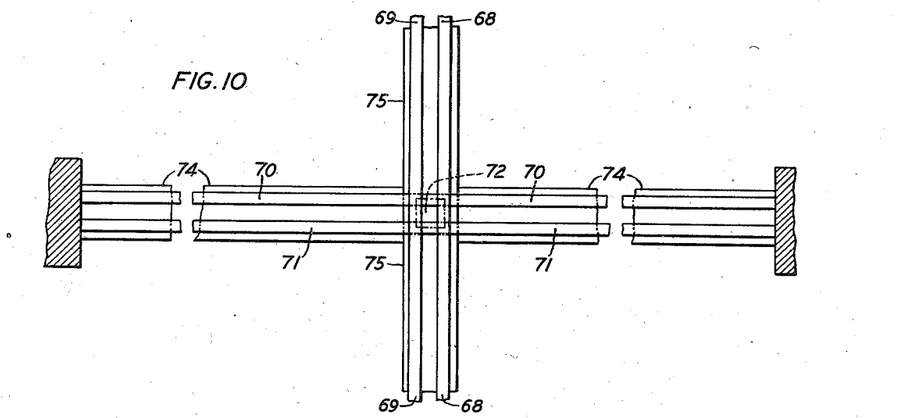
Fig. 10 illustrates a form of light valve in which two pairs of ribbons extending at right angles to each other in the same transverse magnetic field cooperate in the control of the area and position of the light opening.

Fig. 10 illustrates generally a form of light valve which may be employed for effecting in the same structure both the modulation of the translating line of light in accordance with sound and the compensating shift of the line of light upon the sound track, for recording in accordance with the arrangement schematically shown in Fig. 4. The pair of ribbons 68 and 69, connected in a loop in their energizing circuit, control the transverse length of the line of light on the film for making a variable area record; and the ribbons 70 and 71, which are connected in parallel in their energizing circuit, effect the compensating shift of the line of light. Light from the exciting lamp is focused upon the area 72 defined by proximate edges of the two pairs of ribbons, this area being enlarged and diminished by the movement of the ribbons 68 and 69, and being moved up and down by the movement of the transverse ribbons 70 and 71. The broken line 73 represents the aperture in the light valve structure through which light passes between the exciting lamp and the film. The rectangularly disposed pole-faces 74 and 75 underlie the two pairs of ribbons, and similarly disposed pole-faces overlie them. The transverse magnetic flux may be produced by a pair of permanent magnets as in the ordinary light valve. The plane of the ribbons 68 and 69 lies slightly below the plane of the ribbons 70 and 71 in order to provide clearance, and the underlying and overlying pole-faces 74, 75 may have the planes of their surfaces correspondingly elevated or depressed to produce uniform minimum air-gaps for the two sets of ribbons. In projecting upon the film the light that passes through the aperture 72, suitable lenses are employed for expanding the light in its horizontal dimension and contacting it in its vertical dimension to produce a long narrow line of light, the length of which is controlled by the movement toward and away from each other of the ribbons 68 and 69. If desired, in order to increase the compensating shift of the line of light upon the film the ribbons 70 and 71 may be made of such a length and tuned to such a relatively low frequency as to permit them to have the desired range of movement in an up-and-down direction. In this case the aperture 73 may be lengthened in its vertical dimension, and the ribbons may be provided with a shield exceeding the length of the aperture, as has been described in connection with the modification illustrated in Fig. 9.

It may be mentioned that the structural form of light valve with two sets of transversely disposed ribbons as illustrated in Fig. 10 may be used, by connecting the ribbons 70 and 71 in a loop in the appropriate control circuit, for adjusting the area of the opening 72 and closing it during those intervals when no sound currents are flowing in the circuit of ribbons 68 and 69, for applying the principles of the well-known "noiseless" recording to the making of a variable area record.

Figure 11:
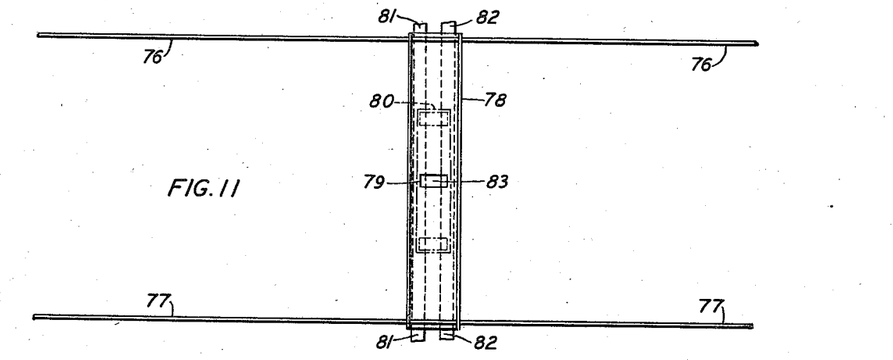
Fig. 11 illustrates a light valve for controlling the compensating shift of the line of light especially designed to permit a wide range of movement of the light aperture.

Fig. 11 represents, on a very much enlarged scale, a portion of a compensating light valve structure which is adapted to permit a relatively large compensating movement of the line of light upon the film. In order to avoid the transverse or edgewise stiffness that is inherent in the ribbon form of light valve, wires 76 and 77 of circular cross-section are used. Carried by the two wires at their centers is a shield 78 having an aperture 79 midway of its length. The aperture 79 normally registers with the middle of the vertically elongated aperture 80 in the valve structure, upon which aperture the light from the exciting lamp is focused. When the compensating current passes in parallel over the wires 76 and 77 their resulting reaction with the transverse magnetic field moves the shield 78 with its aperture 79 up and down to produce the corresponding shift of the line of light on the sound track of the film.

Merely as an illustration of one of the many dimensional relationships that may be employed in such a structure, it may be assumed that the wires 76 and 77 are wires two mils in diameter and two inches long, and sufficiently tensioned to give the moving system, including the shield 78, a natural frequency of somewhere between 500 and 1000 cycles per second. This is upon the assumption that the highest of the disturbing frequencies that are to be compensated for are not much in excess of 100 cycles per second. Of course, the lower the natural resonant frequency of the moving system, the less the energy required to produce the required movement. But the resonant frequency should be high enough to be well above the highest of the range of frequencies that are to be compensated for, and also should be high enough to avoid sensitiveness to mechanical vibrations. The shield 78 is of very light material, say, ½ mil thick sheet duralumin, and may be of channel shape cross-section to increase its rigidity. It may be assumed that the shield 78 is 15 mils wide by 220 mils long, that the aperture 80 in the valve structure is 12 mils wide and 110 mils long, and that the shield aperture 79 is 5 mils high and 11 mils wide.

In Fig. 11 the compensating control feature is illustrated as being combined in a cross-wire light valve structure with a pair of transverse ribbons 81 and 82 for variable area recording. The movement of the ribbons 81 and 82 toward and away from each other co-operates with the shield aperture 79 in controlling the size of the light aperture 83. The light valve ribbons 81 and 82 may be assumed to be 6½ mils wide and ½ mil thick.

Figure 12:
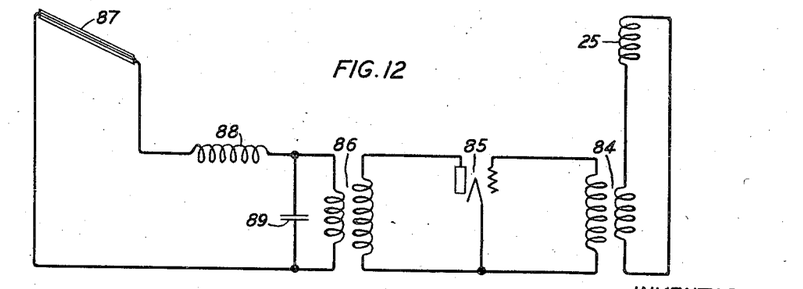
Fig. 12 is a schematic illustration of an electrical connecting link such as may be provided between the velocity variation pick-up device and the light valve for delivering compensating currents to the light valve in proper phase and amplitude.

In describing the schematic illustrations of Figs. 1, 2, 3 and 4, I have referred to the element 26 merely as a device for amplifying the electromotive forces derived from the pick-up coil 25 and delivering corresponding currents in proper phase and amplitude to the compensating light valve or oscillograph. Fig. 12 illustrates schematically one of the forms which such a device or portion of the system may assume. The velocity variation electromotive forces set up in the pick-up coil 25 pass to the primary winding of a transformer 84, the secondary winding of which is connected with the input circuit of an amplifier 85. The currents in the output circuit of the amplifier pass through one of the windings of a transformer 86, the other winding of which is connected in the energizing circuit of the compensating light valve 87. This circuit is provided with an inductance 88 and a capacity 89 having such constants and so arranged as to cause the currents corresponding with the velocity variations in the sound sprocket rotation to be communicated in proper amplitude. The inductance 88 and the capacity 89 are such as to give the light valve energizing circuit in which they are included a natural resonant frequency below the lowest velocity variation frequency that is to be compensated for. Phase and amplitude correcting circuits of the general character illustrated in Fig. 12 are well understood in the art, and may readily be provided for the proper interconnection of whatever velocity input device 25 and whatever velocity output device 87 it may be desired to operatively associate.

What is claimed is:

1. The method of compensating for velocity variations in the movement of a sound record film past a translating point, which consists in converting said velocity variations into corresponding electrical variations, and utilizing said electrical variations to constantly adjust the position of the translating point in correspondence with the velocity variations of the film.

2. The method of compensating for velocity variations in the movement of a sound record film past a translating point, which consists in generating electric currents varying in correspondence with the velocity variations of the film, and utilizing said electric currents to effect a continuous adjustment of the position of the translating point with respect to the film to produce a substantially unvarying rate of movement of the film past the translating point.

3. The method of compensating for velocity variations in the rate of movement of a sound record past a translating point, which consists in converting the velocity variations into correspondingly varying forces and utilizing said forces to effect a constant adjustment of the position of the translating point, whereby the sound record is given a substantially uniform velocity of movement past the translating point.

4. The method of counteracting the effect of velocity variations in the rate of movement of a sound record, which consists in using such velocity variations for creating correspondingly varying forces, and applying said forces for varying the point of translation to produce a substantially uniform velocity relation between the sound record and its translating point.

5. The method of counteracting the effect of irregularities in the forces which determine the velocity of movement of a sound record past its translating point, which consists in utilizing said forces to effect a continuous positional adjustment as between the film and its translating point to produce a substantially uniform velocity of movement of said sound record with respect to the translating point.

6. The method of counteracting the effect of irregularities in the forces that determine the velocity of movement of a linear sound record past its translating point, which consists in utilizing such irregularities to effect a continuous corresponding positional adjustment between the linear record and its translating point so as to produce a substantially uniform rate of movement of the record with respect to the translating point.

7. The method of counteracting the effect of irregularities in the forces which control the rate of movement of a sound record film past its translating point, which consists in converting the irregularity components into corresponding forces, and utilizing said forces to effect compensating movements between the film and the translating point in proper phase and magnitude to produce a relatively uniform translation of the sound record.

8. The method of compensating for velocity variations in the movement of a sound record film past its translating point which consists in constantly adjusting the position of the translating point simultaneously with the movement of the record film in correspondence with such velocity variations.

9. In a sound picture apparatus employing a linear record carrier, sound translating mechanism including a device adapted to move the sound translating point longitudinally of the record carrier, and means responsive to velocity variations in the movement of the carrier for actuating said device.

10. In a sound picture apparatus employing a linear record carrier, sound translating mechanism including a device adapted to effect a compensating movement of the translating point with reference to the carrier, and means responsive to velocity variations in the movement of the carrier for effecting the compensating movement of said device.

11. In a sound picture apparatus employing a photographic sound record film, sound translating mechanism including a device adapted to effect a compensating movement between the translating line of light and the record film, and means responsive to velocity variations in the movement of said film for actuating said device.

12. In a sound picture apparatus employing a linear sound record carrier, sound translating mechanism including a device adapted to effect a compensating movement between the translating point and the sound record carrier, and means adapted to convert velocity variations in the movement of the carrier into corresponding electric currents and apply the same to said device to cause said compensating movement.

13. In a sound picture apparatus employing a linear sound record carrier, sound translating mechanism including a device adapted to effect a compensating movement of the translating point at the sound record carrier, an electric generator operatively associated with the record carrier and adapted to convert velocity variations in the movement of the carrier into corresponding electric current variations, and a circuit for applying said varying electrical currents to said device in proper phase and amplitude to effect said compensating movement of the translating point at the carrier.

14. In a sound picture apparatus employing a photographic film sound record, sound translating mechanism including a device adapted to effect a compensating shift of a translating line of light at the film, a sprocket for moving the film past said translating line of light, an electric generator for converting velocity variations in the rotation of said sprocket into corresponding electric variations, said generator comprising an electrically conducting element rigidly associated with said sprocket to rotate therewith, a magnet having a field cut by the electrically conducting element in its rotation, and a stationary coil associated with said magnet and conducting element in which coil electric currents are induced corresponding to the velocity variations of said element, and means for applying said varying electric currents to said device to cause a compensating shift of the translating line of light at the film.

15. In a sound picture system, a rotating member for moving the sound record, an eddy-current generator having an element associated with and moving with said member, a stationary coil in inductive relation with the eddy-currents set up in said generator, a sound translating point, and a device adapted to control the relative movement between said sound record and said translating point, said device being controlled by the currents inductively set up in said coil for altering the position of said point.

16. A velocity control device for sound records including a stationary magnet, a moving electrically conductive element adapted to cut the flux field of said magnet, and a stationary winding so related to said magnet as to have set up in it electromotive forces varying in correspondence with the variations in velocity of said moving electrically conductive element.

17. A velocity control device for sound records, including a stationary magnet, a rotatable electrically conductive element adapted to cut the flux field of said magnet to produce eddy-currents in said element, and a stationary coil so disposed as to include part of the flux field of said magnet and to have electromotive forces generated in it corresponding to velocity variations in the rotation of said electrically conductive element.

18. A velocity control device for sound records, including a magnet having a bifurcated pole-piece, a rotatable electrical conducting element adapted in its rotation to cut the flux field between the pole-pieces of said magnet, and a coil wound upon each branch of said bifurcated pole-piece, the coils being connected in aiding relation with each other with respect to the electromotive forces set up therein by velocity variations in the rotation of said electrically conductive element.

19. A velocity control system for a photographic sound record film, comprising a sprocket for moving said film past the sound translating point, a magnet having a coil so placed as to include part of the flux field of said magnet, an electrically conductive element connected with said sprocket to rotate therewith and adapted to cut the flux field of said magnet, and a device for controlling the relative velocity between the film and its translating point, said device being energized by the varying electromotive forces set up in said coil in accordance with the velocity variations of said movable electrically conductive element.

20. A velocity control system for photographic sound record films, including a diamagnetic wire light valve for effecting a compensating movement of a line of translating light at the film, the movable element of said light valve being tuned to a relatively low resonant frequency above the highest frequency that is to be compensated for and means for operating said light valve.

21. A velocity control system for photographic sound record films, including a light valve for effecting a compensating movement of a line of translating light at the film, and means adapted to convert velocity variations in the movement of the film into corresponding electric currents and apply the same to said light valve to cause said compensating movement of said line of light.

22. A velocity compensating system for photographic sound record films, including a light valve for effecting a compensating movement of a line of translating light at the film, the movable element of said light valve being provided with a slit aperture that is moved without change of area in the movement of said element, and means for converting velocity variations in the movement of said film into corresponding electrical currents and applying said currents to the light valve to reflect the compensating movement of the line of light.

23. The method of compensating for angular movements causing variations of fractional second duration from a continuous sustained velocity of a sound record film as it passes the point of sound translation, consisting in converting said angular movements into corresponding electrical variations and in using said electrical variations to effect an adjustment of the sound translation point corresponding with the variations from said continuous sustained velocity.

24. The method of compensating for angular movements of differing amplitudes causing variations of fractional second duration from a continuous sustained velocity of a sound record film as it passes a point of sound translation, consisting in converting said angular movements into corresponding electrical variations and in using said electrical variations to effect an adjustment of the sound translation point corresponding with the amplitudes of the variations from said continuous sustained velocity.

25. The method of counteracting the effect of angular movements causing velocity variations of fractional second duration from a continuous sustained velocity of a sound record film as it passes a point of sound translation, consisting in converting such angular movements into corresponding forces capable of effecting an adjustment of the sound translation point corresponding with the variations from said continuous sustained velocity.

26. In a sound picture apparatus employing a linear sound record carrier, sound translating mechanism including a device operable by electrical energy for effecting a linear movement of the translating point, a drive for said record carrier subject to angular velocity variations, and means associated with said drive for converting said angular velocity variations into corresponding electrical variations for operating said device.

27. In a sound picture apparatus employing a linear sound record carrier, sound translating mechanism including a light valve operable by electrical energy for effecting a linear movement of the translating line of light, a drive for said record carrier subject to angular velocity variations, and means associated with said drive for converting said angular velocity variations into corresponding electrical variations for operating said light valve to coordinate the linear movements of the light valve with the velocity variations of the record carrier.

EDWIN H. SMYTHE.